Aug. 23, 1927.

O. R. HUMPHREYS 1,639,999

SEWER PIPE

Filed Feb. 6 1926

Inventor

O. R. Humphreys.

By Arthur H. Sturges

Attorney

Aug. 23, 1927.  
O. R. HUMPHREYS  
1,639,999  
SEWER PIPE  
Filed Feb. 6 1926  
2 Sheets-Sheet 2

Inventor  
O. R. Humphreys  
By Arthur H. Sturges.  
Attorney

Patented Aug. 23, 1927.

1,639,999

UNITED STATES PATENT OFFICE.

OMAR R. HUMPHREYS, OF OMAHA, NEBRASKA.

SEWER PIPE.

Application filed February 6, 1926. Serial No. 86,604.

This invention relates to sewer pipes, or the like and has particular reference to a novel joint for the pipe sections.

An object of the invention is to provide pipe joints which may be sealed without waste of cement as heretofore.

Another object is to provide such a construction for a joint that it may be sealed by flowing the plastic sealing cement downwardly thus omitting overhead sealing.

A still further object is to provide pipes which are adapted to be laid in trenches, the width of said trenches being substantially the same as the diameter of the pipes, thus saving excavating expense.

Another object is to provide a reinforced sealing joint.

A further object is to provide a better sealed and hence more durable joint than heretofore.

Another object is to provide such a construction that manufacture will be cheap and labor of installation economical and the invention includes such further objects and advantages as appear in the following detailed description, in which Fig. 1 is a cross sectional view of a sewer pipe joint taken along the dotted line 1—1 of Fig. 5 and looking in the direction of the arrow, the contour of a trench being shown in dotted lines.

Figure 1:
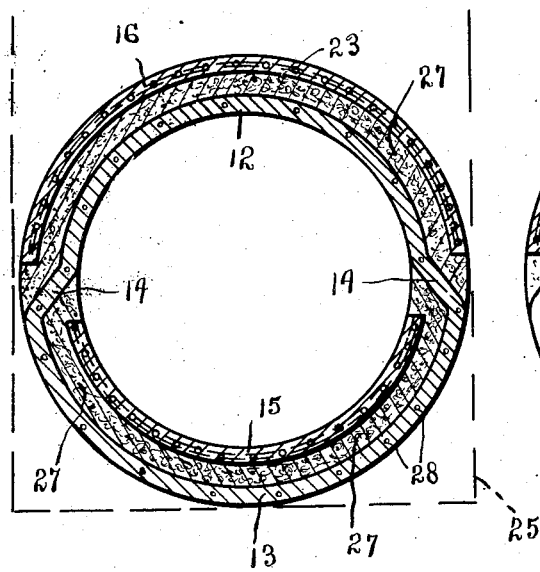
Figure 2:
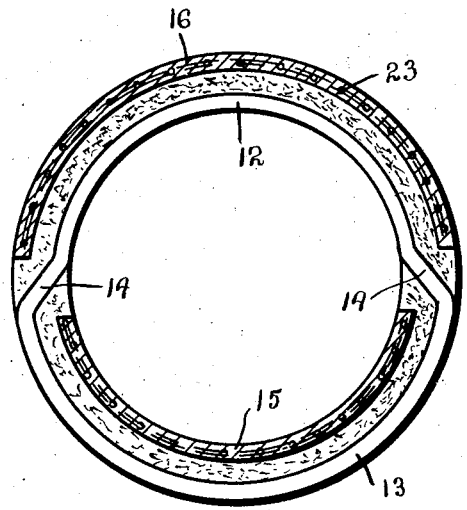
Fig. 2 is a similar view along dotted line 2—2 of Fig. 5.

Referring now to the drawing in which like reference characters indicate like parts, numerals 10 represent cylindrical pipe sections adapted to be connected when disposed end to end, said pipe sections preferably being constructed of concrete or similar adhesive material and to be reinforced by metallic strands 11 disposed longitudinally and embedded in their walls, or strands 11' disposed circularly therein.

Each end of each section is provided with a continuous flange which projects beyond its end, but for convenience of description and on account of the novel construction, cooperation of parts and useful features to be disclosed, they are numbered separately.

Numeral 12 indicates a segmental flange for one of the ends of each section. This flange is disposed flush with the concave surface of a section and for pipe sections having a considerable diameter, said flanges 12 preferably project approximately six inches beyond the end of the pipe-section.

Numeral 13 indicates a second segmental flange for the same end of the pipe section as that of the flange last mentioned, and is disposed flush with the convex surface of a section and projects beyond the end of the section the same distance as the projection of flange 12.

Figure 3:
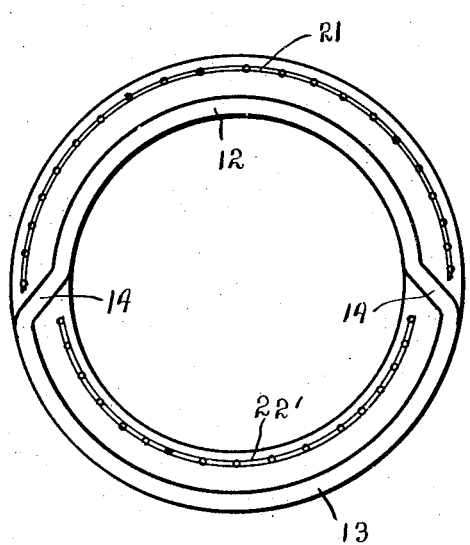
Fig. 3 is an end view of a pipe section showing its inner and outer segmental flanges.

By referring to Fig. 3 it will be seen that each flange 12 and 13 occupies an arc of nearly 180 degrees, their inner ends being connected by inclined flanges 14, the inclination of members 14 being downwardly and outwardly of the end of a section.

Figure 4:
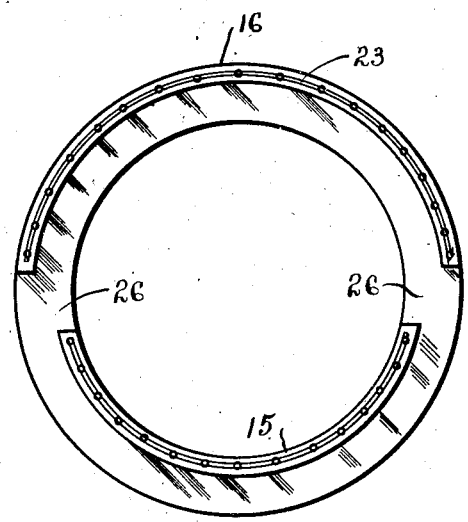
Fig. 4 is a view of the opposite end of the pipe section shown in Fig. 3, illustrating its inner and outer segmental flanges.

That end of each cylindrical pipe section opposite to the flanges last described is provided with a pair of segmental flanges 15 and 16, best shown in Fig. 4 of the drawings, the upper flange 16 being designated as an outer flange since it is disposed at the convex surface of a pipe section and the lower segmental flange being designated as an inner flange since it is disposed at the concave side of a pipe section, said flanges 15 and 16 being approximately of equal length and of such proportions that they project a lesser distance beyond the end of a section than the projection of the flanges 12 and 13.

Figure 5:
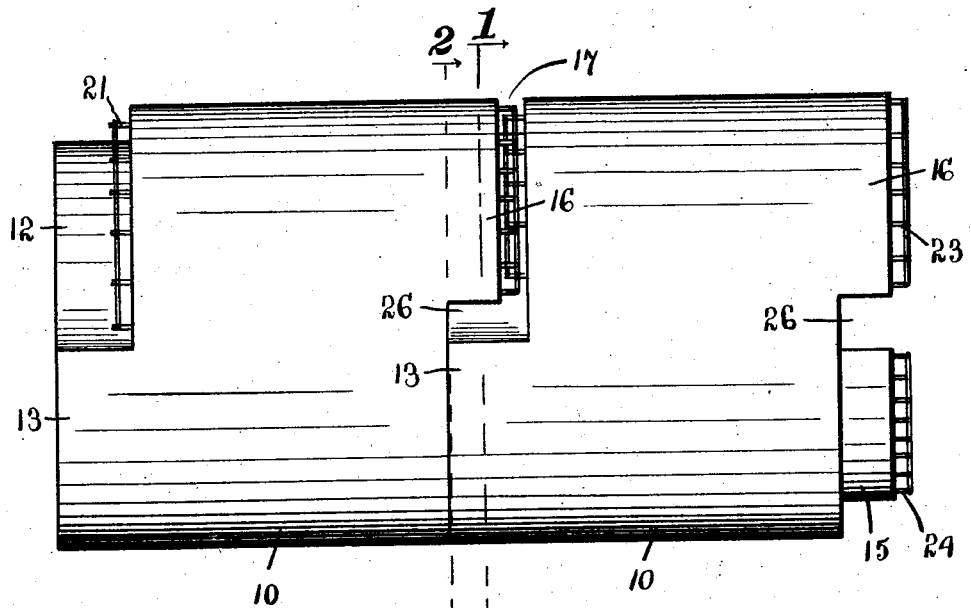
Fig. 5 is a side elevation showing two pipe sections disposed end to end ready to be sealed.
Figure 6:
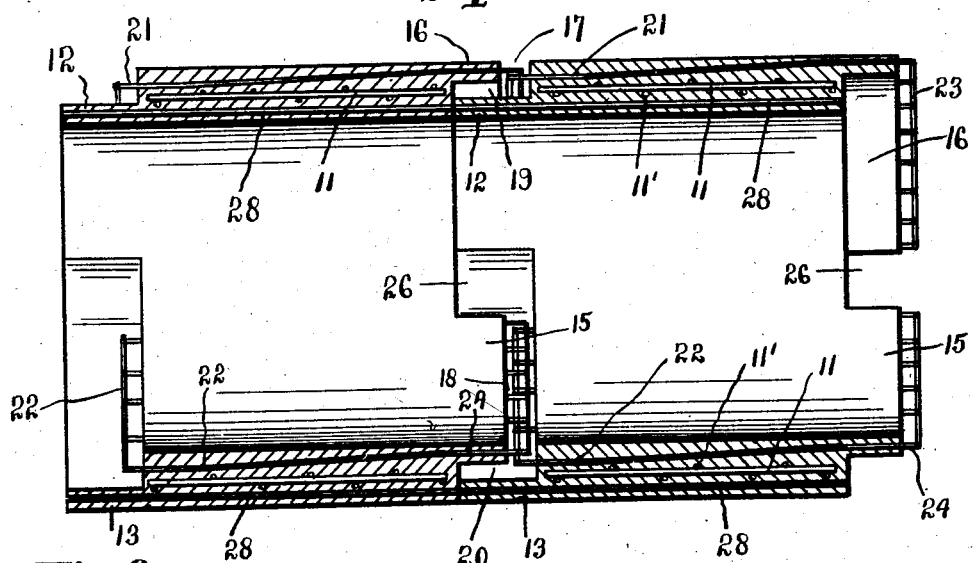
Fig. 6 is a longitudinal section of the pipe sections shown in Fig. 5 the joint sealing cement being omitted.

As clearly shown in the drawings, all of of the flanges have a lesser thickness than one-half the thickness of the wall of a section, and when the sections are disposed end to end an upper recess 17, as clearly shown in Fig. 5 of the drawings will be provided which opens on the outer or convex sides of the sections, and a lower recess 18 will be formed to open on the inner or concave sides of the sections, as best shown in Fig 6. Also a secondary recess 19 will be formed between the flanges 12 and 16 opening on the recess 17, and a secondary recess 20 will be formed between the flanges 13 and 15 opening on the recess 18, all of said recesses 17, 18, 19 and 20 occupying arcs of nearly 180 degrees.

By referring to Fig. 4 it will be seen that the ends of the flanges 15 and 16 are disposed in spaced relation to permit the inclined flanges 14 to be disposed therebetween when the sections are disposed end to end.

Numeral 21 indicates reinforcing strands which are embedded in one end of the wall of each section and which project outwardly to lie adjacent to and outwardly of a flange 12, and similar reinforcing strands 22 are disposed inwardly of the flange 13 and also have parts embedded in the wall of the section.

Numeral 23 indicates a plurality of reinforcing strands which are imbedded in and have parts projecting outwardly of that end of the wall of a section opposite to that last described, to lie adjacent to the end of the flange 16, and similar reinforcing strands 24 are disposed adjacent to the end of the flange 15, and when the pipe sections are disposed end to end, the strands 21 and 23 will be disposed in overlapped relation in the recess 17, said strands 22 and 24 being disposed in a recess 18.

It will be seen that the parts as described operate to great advantage. The width of a trench 25, shown by broken lines in Fig 1, may have a width corresponding to the diameter of the sections. Since the pipe sections are disposed with their flanges 12 uppermost, the recesses 17 and 19 will, of course, be disposed in similar positions so that these recesses may be conveniently filled, the advantage being that the plastic cement operating as an adhesive filler may be applied poured, or plastered into these recesses without waste of material, and at a very limited expense for labor, the walls of the trench being disposed closely adjacent to the pipe sections and tending to prevent said waste.

The inner recesses 18 and 20 are filled by a workman, who, by assuming a stooping position may readily accomplish this work, and, of course there will be no waste of material since the recesses 18 open on the concave parts of the pipe sections.

While I have not shown any adhesive filler in the drawings except the filler 27 illustrated in Fig. 1 it will be understood that all of the recesses mentioned for the joint are to be filled, including the space or recesses 26 between the terminals of the flanges 16 and 23, the open spaces between said terminals, as mentioned, being provided for receiving the inclined parts or flanges 14.

Since the flanges will resist stresses in a lesser degree than the walls of the sections I provide reinforcing rods 28 which extend in the walls to the ends of the flanges.

I claim:

1. A sewer pipe section comprising a substantially cylindrical body portion having a deep flange at one end and a shallow flange at its other end, said flanges extending axially from the body portion and each composed of a substantially semi-circular section of large radius and a semi-circular section of small radius, and the sections of large and small radius being disposed to opposite sides of the body portion at opposite ends, the shallow flange having gaps between the ends of its semi-circular sections, and bridge portions arranged at an angle between the ends of the semi-circular sections of the deep flange, whereby in interlocking a sewer pipe section with a section already in place the end with the shallow flange may be fitted over the deep flange section of small diameter and guided into position by said inclined bridge portions.

2. A sewer pipe section comprising a substantially cylindrical body portion having a deep flange at one end and a shallow flange at its other end, said flanges extending axially from the body portion and each comprising a semi-circular sections of different diameters, the relatively deep flange having inclined bridge portions between the semi-circular sections thereof for interbracing the sections one against the other and the shallow flange having gaps between the ends of its semi-circular sections for the reception of the bridge portions of an adjacent pipe section, and reinforcements embedded in the body portion and extending at one end through the semi-circular section of large diameter of the shallow flange and at its other end extending from the body portion in spaced relation beyond the semi-circular section of small diameter of the deep flange and adapted to overlap with the reinforcement of the adjacent pipe section when the sections are brought together.

In testimony whereof, I have affixed my signature.

OMAR R. HUMPHREYS.